Jan. 27, 1959 J. A. GAYLORD 2,870,509
WEBBING RELEASE
Filed Aug. 11, 1954 2 Sheets-Sheet 1
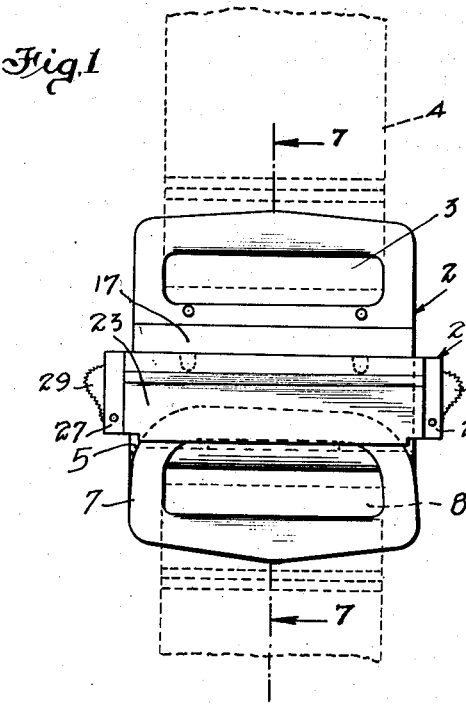
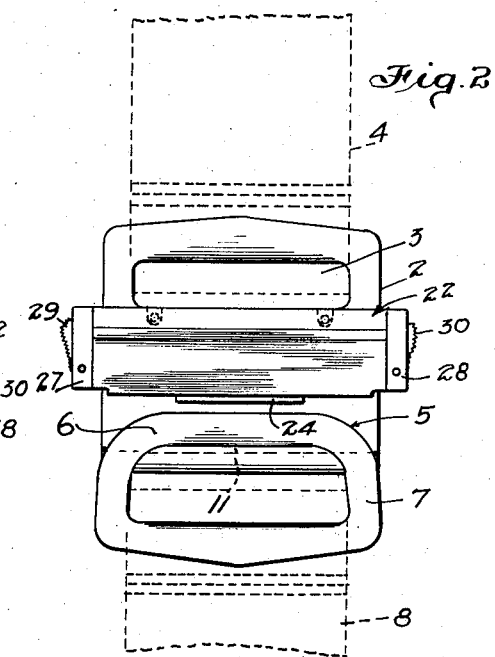
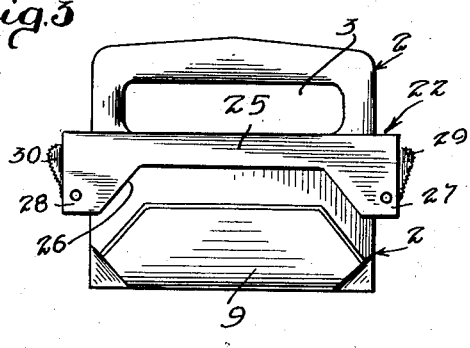
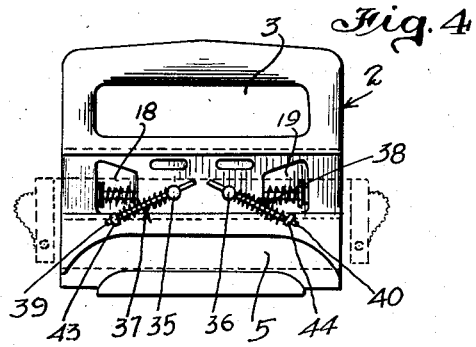
INVENTOR.
JOHN A. GAYLORD
BY
*Lyon & Lyon*
ATTORNEYS Jan. 27, 1959   J. A. GAYLORD   2,870,509
WEBBING RELEASE
Filed Aug. 11, 1954   2 Sheets-Sheet 2
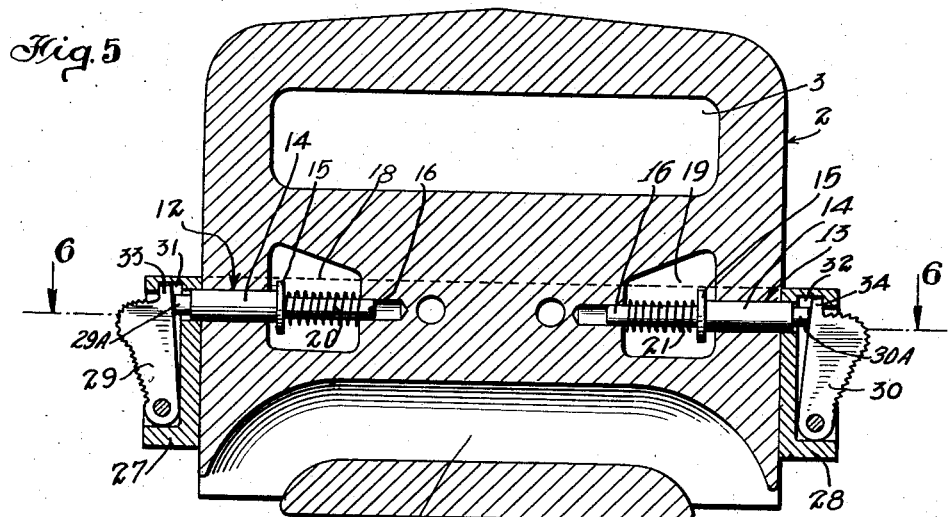
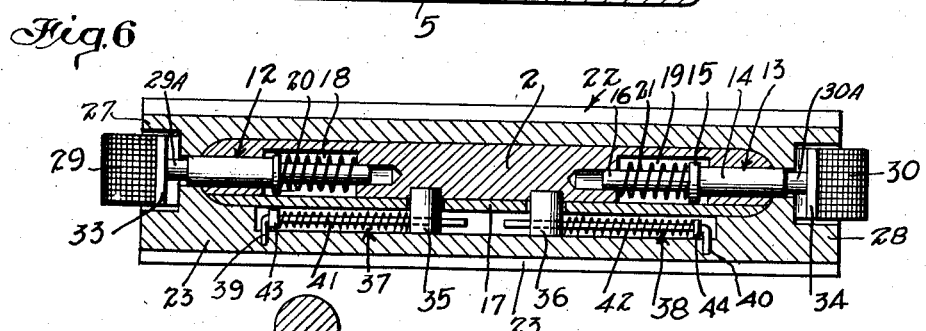
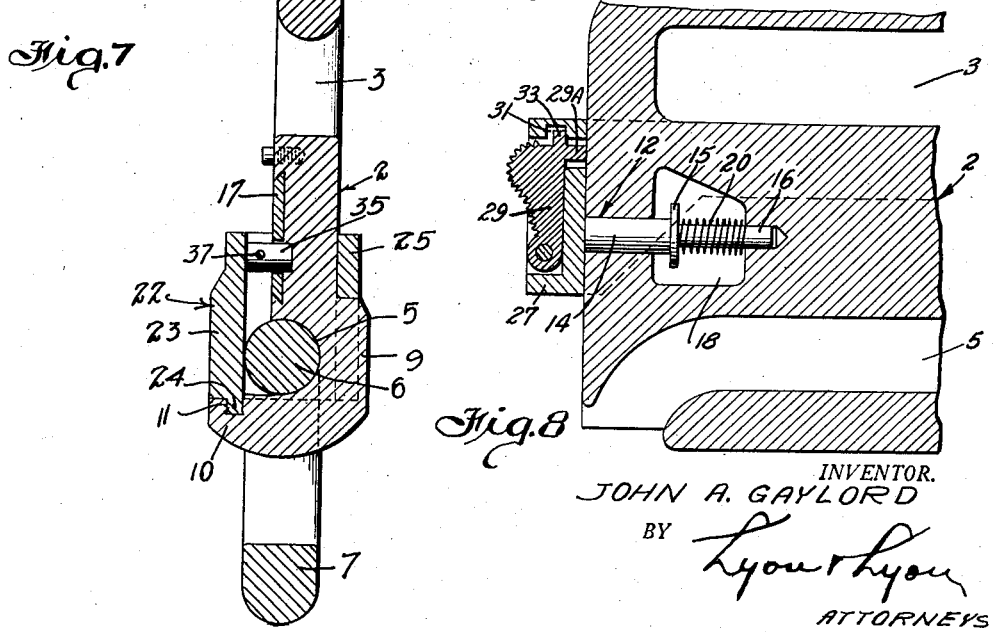
INVENTOR.
JOHN A. GAYLORD
BY
Lyon & Lyon
ATTORNEYS

United States Patent Office 2,870,509
Patented Jan. 27, 1959

2,870,509
WEBBING RELEASE

John A. Gaylord, Pacific Palisades, Calif., assignor of one-half to Rocket Jet Engineering Corp., Glendale, Calif., a corporation of California Application August 11, 1954, Serial No. 449,152

3 Claims. (Cl. 24—230)

This invention relates to a webbing release which has particular utility in connection with an intergraded suit and ejection release apparatus which is designed for bailing out of high flying aircraft. In connection with such intergraded suit and ejection seat release it is desirable to have webbing releases between the parachute and the wearer's harness, and also to have manually actuated releases for the seat in the event of failure of the automatic seat release. These releases must be of simple but sturdy construction and adapted for rapid operation but safely locked until intentionally released.

It is a general object of the present invention to provide a webbing release which is simple, sturdy in construction, adapted for rapid operation both in fastening webbing and in the release of such webbing, and which is also constructed to prevent any accidental release.

In accordance with the present invention a webbing release is provided which includes a body having means at one end for attaching to a webbing and which has a recess encased near the other end which will receive a link from a webbing, in combination with a movable member which is movable to and from a retaining position within its lock and is capable of locking or holding such a link in such recess. The body of the device is made relatively flat and rectangular with the width slightly greater than the webbing and the movable member is made in the form of a flat encircling band. For securely locking this movable member in the retaining position there is provided cooperating bearing faces between the body and the movable member in the retaining position and also a pair of latches or spring-pressed dogs. On the movable member are two pivotally mounted button members capable of being simultaneously pressed in by the fingers of one hand for simultaneously releasing both dogs, whereupon the movable member may be moved to a position to allow escape of the webbing link.

The presence of the two oppositely movable latches with a movable member each independently operated by a pivoted button, while permitting a rapid release by one hand of the operator provides against accidental release. To both facilitate retaining the locking member both in the locking position and in the releasing position, as well as to provide a snap-over center action extending the releasing operation, there is provided a toggle spring connection between the body and the slidable member.

The webbing release of the present invention hereby conforms to the requirements of a simple, sturdy release well protected against accidental release and capable of rapid operation by one hand of an operator.

The webbing release of the present invention, together with further advantages of the invention will be apparent from the following description of the preferred example of the invention, the description being given in connection with the accompanying drawings, in which Figure 1 is an elevation of the webbing release of the present invention in the locked position;

Figure 2 is a similar elevation in the releasing position;

Figure 3 is a rear view of the device in the released position;

Figure 4 is a front view with the front plate removed showing a locking slide in dotted lines in the locked position;

Figure 5 is an enlarged elevation mainly in vertical section;

Figure 6 is a section on the line 6—6 of Figure 5; and

Figure 7 is an enlarged sectional view on the line 7—7 of Figure 1.

Figure 8 is a fragmentary view similar to Figure 3 illustrating the depression of the push-button 30.

Referring to the drawings, the device comprises a metallic body 2 relatively flat rectangular shaped which at its upper end is provided with a rectangular shaped opening 3 by which it may be attached to a webbing 4. In practice the webbing 4 may be part of the parachute harness or seat release. The lower end of the body 2 is provided with a recess 5, the central portion of which is straight and at the ends the recess 5 is curved slightly downwardly as indicated. This recess is designed to received the rounded end 6 of a link 7, which in practice is attached to a webbing 8 which is to be released from the webbing 4. The body 2 has a thickened portion 9 rearwardly of the recess 5 and between the curved ends of the recess 5 the body has a forwardly extending lip 10 which is provided with a horizontal recess 11.

The body 2 is also provided with a pair of oppositely outwardly moving latches or locking dogs 12 and 13 movable in horizontal recesses in the body 2. These dogs comprise an outer larger portion 14, stop flange 15, a portion of reduced diameter 16. Openings 18 and 19 are provided in the body 2 for the purpose of allowing assembling of the dogs in the body, and also to provide a wall for stopping the outward movement of the dogs 12 and 13. The dogs 12 and 13 are yieldingly urged outwardly by springs 20 and 21. Preferably the body 2 is provided with a sliding cover plate 17 to enclose the openings 18 and 19.

The release also includes a locking member or slide 22 in the form of a flat band encircling body 2. The locking slide 22 comprises a front member 23 which, in the closed position as illustrated in Figure 7, is adapted to cover at least the horizontal portion of the recess 5 and thereby hold or lock within said recess the end 6 of the link 7. Preferably on the lower edge of the front member 23 of the locking slide 22 is a rib 24 which engages the horizontal recess 11 to stabilize the locking slide in locked position. The locking slide also includes the rear member 25 which is intended for sliding contact with the body 2 and the lower edge of this rear member 25 is cut away, as indicated at 26, in order to fit around the enlargement 9 of the body 2. The locking member 22 likewise embodies the channel-shaped end members 27 and 28 within which are pivotally mounted the release buttons 29 and 30. Formed on the upper inner face, and aligning with the locking dogs 12 and 13 are pintles 29A and 30A which engage the end of dogs 12 and 13. Openings are provided in the ends 27 and 28 of the locking member for the entrance of the ends of the dogs 12 and 13 which, in the position illustrated in Figure 5, thus provide a means for latching the locking member in position to hold or retain the end 6 of the link 7 within the release. The pivoted release buttons 29 and 30 in such position contact the dogs 12 and 13 and are pivotable inwardly to force the dogs 12 and 13 out of contact with the members 27 and 28, at which time the locking slide member 22 may be moved relative to the body 2. Preferably there are small recesses 31 and 32 in the end members 27 and 28 in which extensions 33 and 34 of the pushbuttons are movable and which serve to limit the outward and inward movement of the pushbuttons 29 and 30. The inward movement of the pushbuttons 29 and 30 is limited to the point where the dogs 12 and 13 just clear the members 27 and 28 without the release buttons 29 and 30 contacting the body 2.

The locking slide member 22 is thus movable to and from a position to entrap the end 6 of the link 7 merely by the operator engaging with one hand the two release buttons 29 and 30 and pressing said buttons inwardly whereupon the slide is moved forwardly to a released position or downwardly to a locked position.

The release of the present invention also preferably includes spring means designed to perform the functions of, first, yieldingly retaining the locking member 22 in the locking position; second, yieldingly retaining the member 22 in the released position after it has been moved to that position; and third, to provide means increasing the speed of the releasing operation. For this purpose there is provided a toggle spring means 37 and 38 formed by the pins 35 and 36 inserted in bores through the cover 17 and body 2 and rotatable in said openings. Toggle members 37 and 38 have one end slidable through diametric bores in pins 35 and 36 and have their other ends bent at an angle as indicated at 39 and 40, which ends are inserted in small bores in the front member 23 of the locking slide and are thereby pivotally mounted. Springs 41 and 42 are provided between the pins 35 and 36 and flanges 43 and 44.

In the locking position of the slide 22 the toggle members 37 and 38 are out of line, the outer ends being angled downwardly and in the released position they are also out of line by their outer ends being angled upwardly, as shown in Figure 4. To move the locking member 22 from the locking position to the released position it is therefore necessary to move these members into the aligned position against the force of the springs 41 and 42, but once the center position has been reached the springs 41 and 42 provide means for facilitating the further movement of the locking member 22 to the released position from the locked position, or vice versa. Accordingly when it is desired to move the sliding member or locking member 22 to the released position for connecting with the webbing, this toggle spring means, as it is moved by the center position, provides a spring pressure to snap the member 22 to released position and holds it against gravity while the link of the webbing is inserted in the recess 5. Then by a simple downward movement of the sliding member as it passes the center position, the toggle spring means snaps the sliding member to the position where the locking means or dogs 12 and 13 are automatically brought into latching engagement with the sliding member 22. It takes a movement of both of the pushbuttons 29 and 30 to release these dogs or latching members in the sliding member 22 but this is easily accomplished with the fingers of one hand and as this sliding member 22 is forced upwardly beyond the center position the toggle springs snap the sliding member to fully released position, whereupon in operation the link attached to the webbing 8 rapidly escapes from the recess 5.

While the particular example of the invention herein described is well adapted to carry out the objects of the invention, this invention is of the scope set forth in the appended claims.

1. A webbing release which comprises, a body having means at one end for attaching to a webbing, and a recess in the other end for receiving a link of the webbing, a member slidably mounted on said body and encircling the same and movable from a retaining position to retain such a link in such recess and to a releasing position to allow the escape of such a link from said recess, a pair of spring-actuated latching members for latching the sliding member in the retaining position, and a pair of oppositely movable buttons for releasing the latching members from said slidable member, a toggle spring means interconnecting the sliding member and body for yieldingly holding the sliding member both in the retaining and in the releasing position.

2. A webbing release which comprises, a body having means at one end for attaching to a webbing, and a recess in the other end for receiving a link of the webbing, a member slidably mounted on said body and encircling the same and movable from a retaining position to retain such a link in such a recess and to a releasing position to allow the escape of such a link from said recess, a pair of spring-actuated latching members for latching the sliding member in the retaining position, and a pair of oppositely movable buttons for releasing the latching members from said slidable member, a toggle spring means interconnecting the sliding member and body for yieldingly holding the sliding member both in the retaining and in the releasing position, the body having a lip adjacent said recess, said lip having a groove, and said sliding member having a portion movable in the retaining position into said groove.

3. A webbing release which comprises, a relatively flat rectangular body having means at one end for attaching a webbing, and a recess in the body near the other end for receiving a link of a webbing, the body having an angularly extending lip at said recess, a sliding member encircling said body and movable into a retaining position in contact with said lip for retaining the link in such recess, and to a releasing position where such link may escape from such recess, the body having a pair of spring-pressed dogs movable outwardly from its opposite edges into locking contact with said movable member for holding the same in the retaining position, a pair of movable buttons mounted on said slidable member moving said dogs to a releasing position, and a toggle spring means between said sliding member and said body adapted to yieldingly hold said sliding member both in the retaining position and the releasing position.

References Cited in the file of this patent

UNITED STATES PATENTS

| 1,463,113 | Bibb | July 24, 1923 |
| 1,920,408 | Lafayette | Aug. 1, 1933 |
| 2,010,277 | Smith | Aug. 6, 1935 |
| 2,197,997 | Dee | Apr. 23, 1940 |
| 2,393,072 | Skinner | Jan. 15, 1946 |
| 2,683,617 | Roethel | July 13, 1954 |
| 2,701,402 | Foster | Feb. 8, 1955 |